May 5, 1964     J. E. GUTHRIE     3,131,541
SYSTEM FOR RELIEVING BURIED CONDUITS OF EXCESSIVE PRESSURE
Filed Aug. 22, 1960     3 Sheets-Sheet 1

INVENTOR.
JAMES E. GUTHRIE
BY
MAHONEY MILLER & RAMBO ATTY'S.
BY

May 5, 1964 J. E. GUTHRIE 3,131,541
SYSTEM FOR RELIEVING BURIED CONDUITS OF EXCESSIVE PRESSURE
Filed Aug. 22, 1960 3 Sheets-Sheet 2

INVENTOR.
JAMES E. GUTHRIE
BY
MAHONEY MILLER & RAMBO ATTY'S.
BY *Wm. V. Miller*

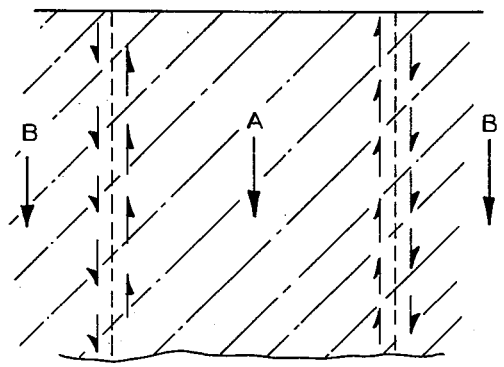
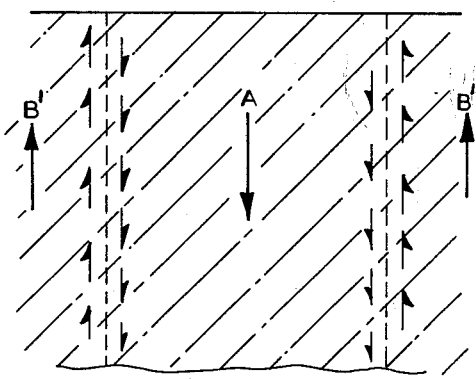
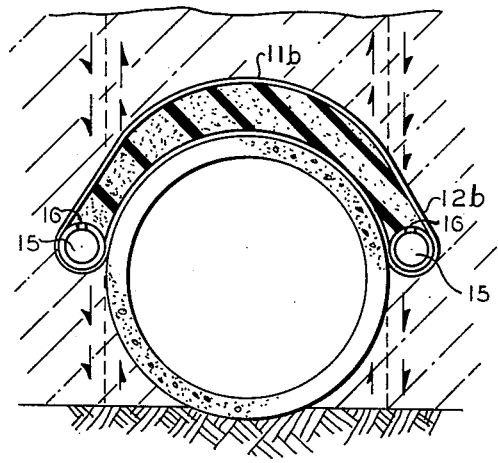
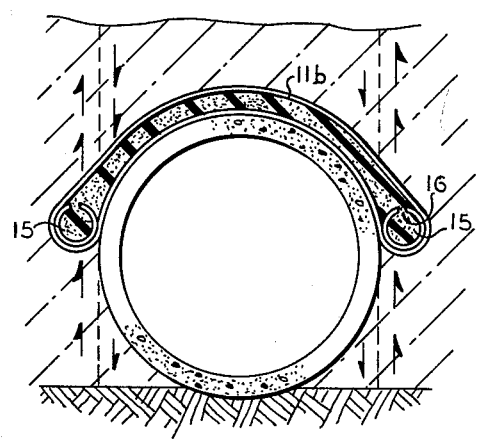
FIG. 7   FIG. 8

United States Patent Office 3,131,541
Patented May 5, 1964

3,131,541
SYSTEM FOR RELIEVING BURIED CONDUITS OF
EXCESSIVE PRESSURE
James E. Guthrie, 693½ High St., Worthington, Ohio
Filed Aug. 22, 1960, Ser. No. 51,106
3 Claims. (Cl. 61—16)

My invention relates to a system for relieving buried conduits of excessive pressure. It has to do, more particularly, with a system for use in connection with large conduits especially of the rigid type, for relieving them of excessive pressure tending to collapse them, after they have been deeply buried in an embankment or other location and the fill or overlying material has settled relative thereto.

When conduits are placed in an embankment or in wide trenches they are subject to certain stresses that are in addition to the weight of the material directly over them. These loads are transmitted to the top of the conduit by frictional force that develops along the two vertical planes bounding a prism of embankment that is directly over the conduit. These frictional forces are relieved in the case of flexible conduits by a construction procedure of forcibly elongating the conduit in a vertical direction and by holding the conduit in this elongated shape by placing struts in the conduit. The struts are left in place until the embankment is finished and then removed. The removal of the struts allows the flexible conduit to change in shape, so as to relieve some of the pressures over the conduit and the frictional forces reverse to help support the weight of the prism of embankment directly over the conduit by an arching action.

Rigid conduits can not be forcibly elongated and it has been the practice to either build rigid conduits strong enough to carry all of the forces that might be imposed by the weight of the embankment directly above it plus the frictional forces acting on the prism of embankment directly over the conduit, or to relieve these forces by construction procedures that specify imperfect compaction of the embankment directly over the conduit or by placing straw or some other material more yielding than the surrounding embankment directly over the conduit. The disadvantages of either procedure are so great that the use of rigid conduits under high embankments has been limited. The strength that can be economically built into a conduit is usually limited and it becomes impractical to build a rigid conduit strong enough to carry the load imposed upon it by a very high embankment. The use of special construction methods such as placing a relatively uncompacted prism of soil over the conduit or putting such a material as straw in the trench is clumsy and interferes with the continuous operations in constructing large embankments with heavy machinery. The possible uneven and uncontrolled settlement of the embankment is extremely undesirable for an embankment that must serve as the foundation for a structure such as a rigid highway pavement.

The main object of my invention is to provide an economically feasible and practical system whereby the excessive pressure on a buried rigid conduit can be relieved by the application of pressure-relieving means to the conduit, before it is covered with the fill material, so that the rigid conduit will perform in substantially the same manner as a flexible conduit in which vertically elongating struts are positioned and removed as indicated above.

Accordingly to my invention, I provide a yoke that embraces the top of the conduit and provides a substantial thickness of material thereabove and extends downwardly a selected distance over the sides thereof. The yoke can be placed over the conduit at the factory or in the field. It is so shaped and applied to the conduit that it will cause the effective shape of the outside of the conduit to be elongated vertically and thus, when the yoke-bearing conduit is buried, the conduit will carry the load imposed by the embankment much the same as the elongated and strutted flexible pipe carries the load during construction. When the embankment is high enough to carry the load, the yoke can be allowed to flatten or decrease in thickness over the conduit, either automatically upon the development of predetermined pressures or by actuation of suitable control means at the will of the constructor. The flattening action of the yoke will be analogous to the removal of the struts in the case of the flexible conduit.

From the above, it will be apparent that the yoke can be applied to a rigid conduit and, therefore, make the rigid conduit more versatile since it can then be placed in an embankment under the same conditions as flexible conduit. The yoke will simplify construction procedures and will allow settlement of the embankment to be controlled so that excessive stresses will not be placed on the rigid conduit. Although my yoke system of relieving excessive pressures on the conduit is primarily designed for a rigid conduit, it could be used on flexible conduits and thus avoid the materials and labor that are necessary to strut the flexible conduit. However, since the system is especially useful in connection with rigid conduit, the following description will refer specifically to rigid conduit.

In the accompanying drawings, I have illustrated the system of this invention and in these drawings.

Figure 5:
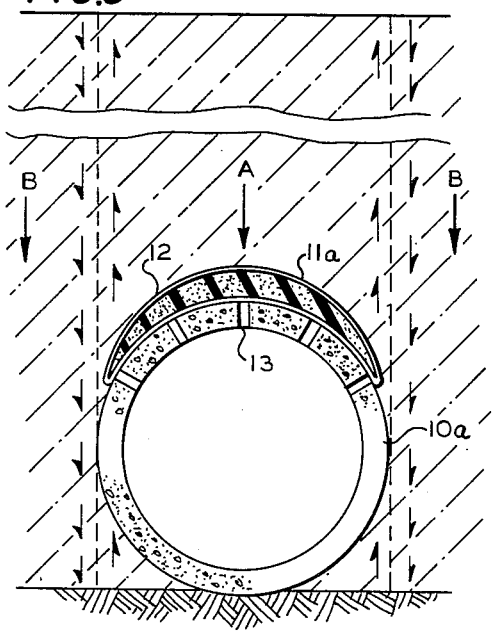
FIGURE 5 is a view similar to FIGURE 3 showing a different type of yoke applied to the conduit.
Figure 6:
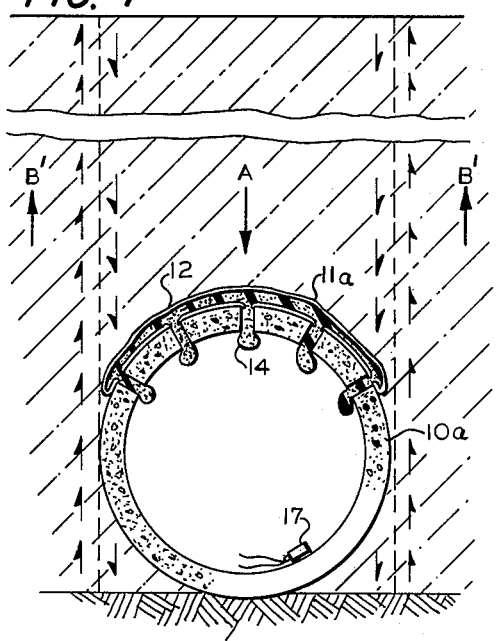

FIGURE 6 indicates the relationship of forces after the yoke of FIGURE 5 flattens.

Figure 3:
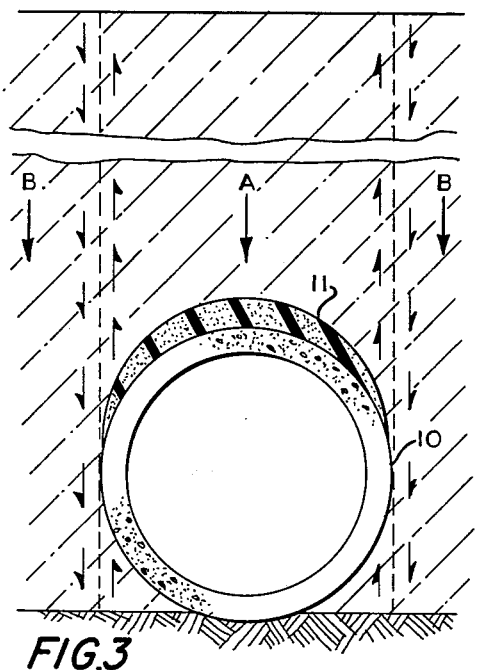
FIGURE 3 is a diagrammatic transverse section showing the conduit of FIGURE 2 buried and showing the relationship of forces acting on the conduit before the yoke is flattened.

FIGURE 7 is a view similar to FIGURES 3 and 5 but showing another type of yoke.

FIGURE 8 is a view similar to FIGURE 7 showing the yoke after it flattens.

The yoke is so formed of such material that it is a flexible coherent body due to the nature of the mass of the yoke-forming material or to a flexible housing or diaphragm enclosing it. The yoke is so formed that the mass of the material will occupy the same volume of space both before and after flattening but the mass will be redistributed differently by a flowing action from the original disposition so as to provide for flattening of the yoke. This redistribution will be automatic or will be manually controlled as indicated above.

The yoke will initially cover approximately the upper one-third of the conduit and will consist of a central relatively heavy or arch section on top of the conduit and depending sides of lesser thickness. As indicated, it is so designed that it can change shape by displacement of a portion of its mass automatically upon the development of predetermined pressure on the yoke or selectively at the will of the constructor. This can be accomplished by allowing part of the mass of material in the yoke to shift from the top to the sides or by allowing it to flow into voids, so that the yoke is flattened. The accompanying drawings show arrangements to permit flattening of the yoke as indicated above but these are by no means the only methods and are for purpose of illustration only.

With reference to the drawings, I have illustrated an embankment E which may be, for example, a highway embankment. Extending transversely through this embankment is a conduit consisting of rigid pipe sections C. Extending along the top of the conduit is a yoke Y of the nature specified above which may be of short sections or a single long section extending in the heavier part of the embankment where protection for the conduit is needed. The yoke may be applied in sections to the conduit section at the factory or it may be formed and applied in the field or merely be applied in the field.

Figure 1:
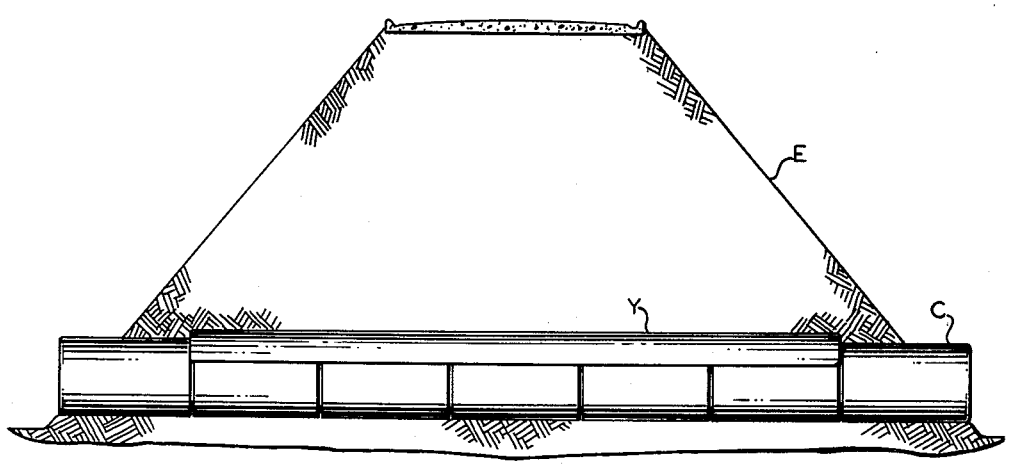
FIGURE 1 is a section taken transversely through an embankment showing rigid conduit therein having the yoke system of my invention applied thereto to protect it.
Figure 2:
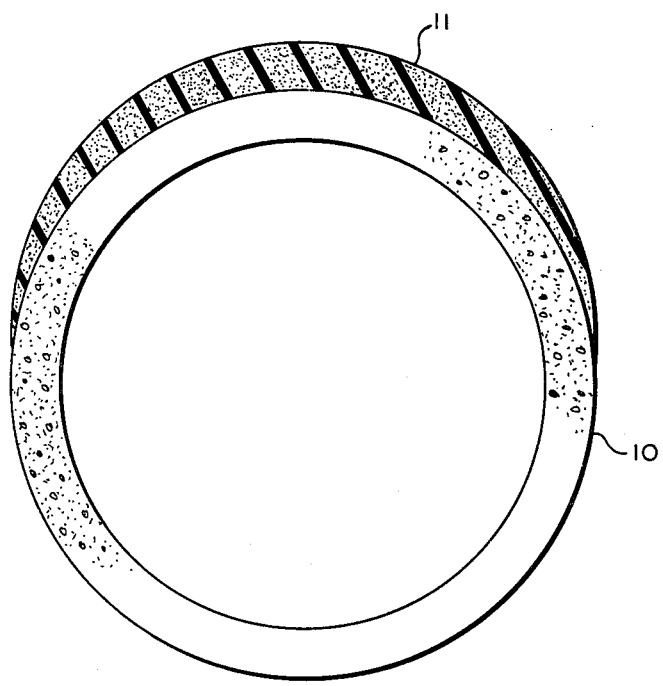
FIGURE 2 is a transverse section through a rigid conduit showing a yoke applied thereto.

One form of the yoke is illustrated in FIGURE 2. In this instance, the rigid conduit 10 has a yoke 11 disposed thereon. The yoke 11 is thickest at its center and gradually decreases in thickness at its sides which extend downwardly around the conduit covering almost one-half of the circumference of the pipe or about one-third of its depth. In this case, the yoke is a cohesive plastic mass which can be displaced under suitable pressure so that the yoke will change shape, that is, flatten. The yoke 11 may be made of various materials but suitable materials are sand and asphalt, when the sand is bound together by the asphalt into a cohesive mass. Rubber, plastic, and various other materials can be used to provide a cohesive plastic mass capable of displacement so as to flatten the yoke. Because the yoke is a cohesive mass, which can be applied to the conduit and will remain in position thereon, covering of the yoke-bearing conduit will be simple and the usual machinery can be employed. If desired, the mass of material may be enclosed within a diaphragm (not shown) of flexible material, such as paper, plastic, rubber, etc.

Figure 4:
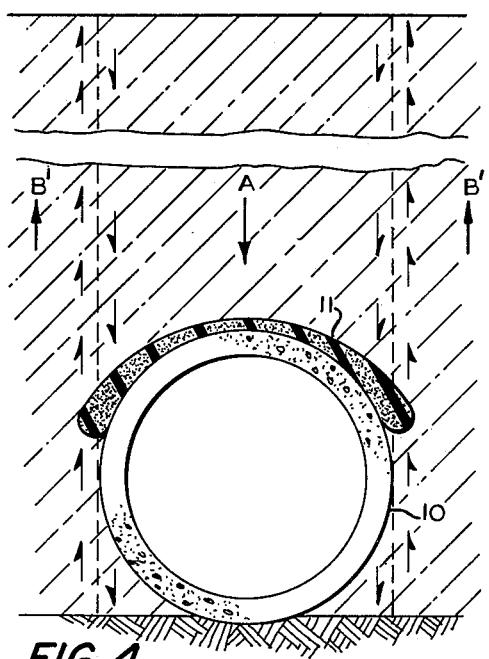
FIGURE 4 is a view similar to FIGURE 3 but showing the relationship of forces after flattening of the yoke.

When the conduit 10 is embedded as shown in FIGURE 3, the effect of the yoke 11 on the conduit 10 will be that of a vertically extended pipe or conduit. The column of fill directly over the conduit will act downwardly as indicated by the arrow A as also will the columns at each side of the conduit, as indicated by the arrows B. When the column of fill material over the pipe settles, as indicated in FIGURE 4, the yoke 11 will be flattened because of the development thereon of a predetermined pressure. This flattening will occur by displacing the material of the yoke 10 to the sides of the conduit as indicated. This permits the center column of fill over the conduit to settle relative to the side columns of fill at each side of the conduit. The resulting friction between the center and side columns will cause the side columns to act as supports and the direction of the force indicated by the arrows $B^1$ will be reverse. Flattening of the yoke 11 results in an arching of the fill to prevent excessive forces on the conduit and distributes the remaining pressure of the embankment more evenly over the top of the conduit.

In FIGURE 5, a dfferent type of yoke 11a is provided. In this instance, a flexible housing or diaphragm 12 encloses a plastic material which may, for example, be sand that is provided with a suitable binder to make it a coherent but flowable plastic mass. The yoke 11a in its entirety will initially be of the same shape as the yoke 11 previously described, and may be placed over the conduit 10a where a series of openings 13 are provided in the wall of the conduit. The diaphragm over the openings may be designed to rupture under certain pressure or separate diaphragms (not shown) may be provide over the openings. In either case, when the diaphragm or diaphragms rupture, the material within the diaphragm 12 will extrude as columns 14 through the openings 13. This will permit flattening of the yoke 11a as indicated in FIGURE 6 and development of the reverse supporting forces $B^1$ as before.

Instead of relying upon pressure to rupture the diaphragm 12, devices controlled remotely may be used. For example, ordinary plugs (not shown) may be provided in the holes and be pulled out by lines running to a remote location outside the conduit. One of these is shown at 17 in FIGURE 6 after it has been pulled from the opening. Or this could be an electrically energized heating or puncturing device which would rupture the diaphragm by heat, this device also being controlled remotely from outside the pipe and dropping from the opening as the material starts to flow therethrough. Thus, the holes to permit displacement of the material in the yoke to permit flattening thereof may be opened by the development of suitable pressure or at the will of the constructor in various ways.

In FIGURE 7, the yoke 11b is similar to that of FIGURE 5 but instead of the material within the diaphragm or housing 12b being displaced into the interior of the conduit it is displaced into void chambers 15 extending longitudinally at the sides of the pipe. These chambers and the diaphragm have a common wall in which discs 16 are provided which can be ruptured or displaced by pressure or by remotely controlled means (not shown) but similar to those described with reference to FIGURES 5 and 6. When the discs 16 are ruptured or displaced, the material will be forced or extruded into the void chambers 15 permitting flattening of the yoke 11b. As indicated in FIGURE 8, the result will be the same, that is, the forces $B^1$ will be reversed as compared to the forces B of FIGURE 7. The void chambers 15 may be located at various positions on the yoke.

It will be apparent that my invention provides for the protection of conduit, especially rigid conduit, under an embankment or other fill material. The protection is obtained by the use of a yoke which is a mass of material that can be displaced in a desired manner either automatically or under control. The displacement of the yoke is such that there is brought about an arching of the fill material over the conduit to relieve it of excessive forces and, thereby, to prevent collapse of the conduit. Displacement of the unitary mass of yoke material is relied upon rather than compression of the material in relieving the stresses. The material of the yoke, according to my invention, is displaced by a flowing action, the flow of material taking place either into an area of lesser pressure or into actual voids provided for that purpose. The flowing action or displacement of the yoke material is controllable so that a predetermined displacement will occur under selected pressure conditions.

Although this invention has been described with reference to conduits of annular cross-section, the principles thereof are not limited to conduit of that particular shape.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. In combination with a conduit buried in fill material, a device for protecting the conduit from excessive forces from the fill material comprising a protective yoke disposed over the conduit embracing at least the top and sides of the upper portion of the conduit and extending along the full length of the buried conduit to be protected, said protective yoke being a simple unitary body of material which can be displaced under pressure exerted by the overlying fill material when the conduit is buried by flowing to an area of lesser pressure to allow arching of the fill material over the conduit so that displacement of the protective material will be relied upon to prevent excessive forces on the conduit created by settling of the fill material, in which the yoke is composed of a flexible diaphragm housing enclosing flowable material.

2. The combination of claim 1 including means for rupturing the housing to permit flowing of material therefrom.

3. The combination of claim 1 including void chambers in cooperation with said housing, and means for permitting flow of material from the housing into said chambers.

References Cited in the file of this patent

UNITED STATES PATENTS

| | | |
|---|---|---|
| 1,435,311 | Knight | Nov. 14, 1922 |
| 1,549,078 | Ferguson | Aug. 11, 1925 |
| 2,408,253 | Diebold | Sept. 24, 1946 |
| 2,507,629 | Gallagher | May 16, 1950 |
| 2,633,284 | Moffett et al. | Mar. 31, 1953 |
| 2,779,462 | Hoag | Jan. 29, 1957 |
| 2,889,922 | Clarvoe | June 9, 1959 |
| 2,891,749 | Heverly | June 23, 1959 |
| 2,896,669 | Broadway et al. | July 28, 1959 |